United States Patent [19]

Martinen et al.

[11] Patent Number: 5,008,896
[45] Date of Patent: Apr. 16, 1991

[54] GAS LASER HAVING A DISCHARGE TUBE THROUGH WHICH THE GAS FLOWS IN AN AXIAL DIRECTION

[75] Inventors: Hinrich Martinen, Quickborn; Karl-Heinz Knobbe, Ellerbek; Samuel S. Simonsson, Winsen-Bahlburg; Peter Wirth, Winsen/Luhe, all of Fed. Rep. of Germany

[73] Assignee: Rofin-Sinar Laser GmbH, Hamburg, Fed. Rep. of Germany

[21] Appl. No.: 37,261

[22] Filed: Apr. 10, 1987

[30] Foreign Application Priority Data

Apr. 18, 1986 [DE] Fed. Rep. of Germany ... 8610693[U]

[51] Int. Cl.$^5$ ............................................. H01S 3/097
[52] U.S. Cl. ........................................ 372/83; 372/81; 372/82; 372/87
[58] Field of Search ...................... 372/81–83, 372/87

[56] References Cited

U.S. PATENT DOCUMENTS 4,217,560  8/1980  Kosyrev et al. ...................... 372/58

FOREIGN PATENT DOCUMENTS 8526361   9/1985  Fed. Rep. of Germany .
0183023A2 10/1985 Fed. Rep. of Germany .

Primary Examiner—Georgia Epps
Attorney, Agent, or Firm—Townsend and Townsend

[57] ABSTRACT

The invention relates to a gas laser having a discharge tube, through which the gas flows in an aixal direction and to which high-frequency electrodes are fitted externally, and having a high-frequency generator. In order to obtain a simpler construction and the smallest possible high-frequency losses, it is provided that the power output stage (12) of the high-frequency generator is disposed in the housing (1) of the laser resonator (2, 7, 8) and is directly connected to the electrodes (9, 10) via impedance adaptation elements (11).

8 Claims, 1 Drawing Sheet

GAS LASER HAVING A DISCHARGE TUBE THROUGH WHICH THE GAS FLOWS IN AN AXIAL DIRECTION

BACKGROUND OF THE INVENTION

1. Field of the Invention

The invention relates to a gas laser having a discharge tube, through which the gas flows in an axial direction and to which high-frequency electrodes are fitted externally, and having a high-frequency generator.

2. Description of the Relevant Art

In such a gas laser, the high-frequency power is coupled via the electrodes capacitively into the gas to be excited. To date, for this purpose the power output stage was always connected to the electrodes via comparatively long conductors, for example coaxial conductors, since it was not considered to be possible to fit the power output stage in the vicinity of the discharge tube. In this connection, the disadvantage did, however, arise that in the first instance an impedance transformation had to be undertaken at the output of the power output stage, in order to obtain an adaptation to the impedance of the conductors, for example of the coaxial cable, which can amount, for example, to 50 ohms or 75 ohms. A further impedance adaptation or transformation was then necessary at the end of the conductor or of the coaxial cable, in order thus to couple the signal optimally out of the cable into the high-frequency electrodes, by means of which the gas is to be excited.

This two-fold impedance adaptation or transformation is very troublesome, and readily leads to non-ideal adaptation and power losses. Moreover, losses occur in the conductors, for example coaxial cables.

SUMMARY OF THE INVENTION

The object of the invention consists in providing an improved gas laser, which has a simple construction and in which the high-frequency losses are minimized.

The solution according to the invention consists in that the power output stage of the high-frequency generator is integrated into the housing of the laser resonator and is directly connected to the electrodes via impedance adaptation elements.

The invention led to the overcoming of the prejudgement that, for constructional-spatial reasons and possibly also on account of mutual high-frequency influencing, it is not possible to accommodate the power output stage in the vicinity of the discharge tube, in particular in the housing of the laser resonator. It is the accomplishment of the invention to have overcome these prejudgements and to have found a spatial arrangement which leads to a substantially improved result.

It is possible to excite more gas and thus to obtain a higher power of the laser, if the gas laser exhibits a plurality of electrodes, which are disposed successively in the longitudinal direction of the discharge tube and which are connected to a common first plate, which extends longitudinally of the discharge tube and which is constructed as one of the layers of an impedance adaptation element in the form of a plate capacitor.

Thus, a plurality of electrodes are connected in series in the direction of the discharge tube. The problems that, in these circumstances, conductors of differing lengths are required between high-frequency generator and the individual electrodes are avoided in that the first plate is provided, which extends longitudinally of the discharge tube and to which the individual electrodes are then connected. This plate forms one of the layers of an impedance adaptation element in the form of a plate capacitor. The other plate-like layer of the plate capacitor is then connected at the high-frequency generator.

If the second plate, which is constructed as the other layer, is disposed to be movable in relation to the first plate, then in this instance the coupling can be varied, in order thereby to vary the high-frequency power irradiated into the gas.

When the gas moves in the direction of the electrodes, then under conditions of high power or of good coupling the problem arises that the plasma is heated so strongly that it becomes conductive. After the plasma has moved through a certain path between two electrodes, a short-circuit for the high frequency is then created, so to speak, at the position at which it is appropriately hot, so that this high frequency collapses, at least partially. This naturally means that the following plasma is no longer excited, until the old condition has been restored. These instabilities can be avoided if the electrodes are disposed in such a manner that their spacing from the discharge tube varies in the longitudinal direction of the same. In particular, the problems can be particularly well avoided if the spacing increases in the direction of flow of the gas.

At the position at which the gas enters between the electrodes, it is in the first instance very strongly excited, since here the spacing of the electrodes from the gas is particularly small and thus the coupling is particularly great. In the further course of the gas between the electrodes, in this arrangement the coupling decreases, so that the mentioned problems of the "short-circuit" no longer arise or still arise only to a negligible extent.

In an advantageous embodiment, it is provided that the spacing increases linearly. However, other functions are, of course, also possible, by which the spacing can increase.

If the space between the discharge tube and the electrodes in the region of the front edges of the same, as seen in the direction of flow of the gas, is filled with a material of high dielectric constant, then this results here, at the position at which the gas enters between the electrodes, in a particularly high field strength of the HF power and thus a particularly good coupling and excitation of the gas. In this arrangement, the material of high dielectric constant can have an annular shape. In this arrangement, the relative dielectric constant of the gas advantageously has a value which is greater than 2.

If a plurality of electrodes are provided in succession, then the wavelength of the high-frequency oscillations may have a magnitude which is no longer negligible in comparison with the resonator length. For this reason, the coupling can be different at various positions of the discharge tube or of the first plate. These problems can be overcome if the first plate, which extends longitudinally of the discharge tube, is connected with inductances. This leads to the overcoming of the disadvantages of the geometric arrangement, which are based on the fact that the discharge tube has a length which is comparable with the wavelength of the high-frequency power.

If the laser resonator and the power output stage of the high-frequency generator are surrounded by an electrically conductive housing, then by this simple mechanical measure an effective high-frequency screening can be achieved, so that no or only very slightly interfering high-frequency radiation can pass to the exterior.

In an advantageous embodiment, the electrodes are adjustable. Thus, in an advantageous embodiment, the spacing of the electrodes from the discharge tube can be adjustable. However, the angle between electrodes and discharge tube can also be adjustable, so that it is possible to obtain the abovementioned advantages of the spacing, increasing in the direction of flow of the gas, between electrodes and discharge tube, and to carry out setting to the optimal value. However, the electrodes can also be disposed rotatably on the discharge tube, so that they (when the high frequency is de-energized) can be rotated or also can be adjusted, during operation, by means of particular setting devices. In this manner, the optimal excitation can be set by relative rotation of the electrodes over the entire path of the discharge tube.

The invention is described below with the aid of advantageous embodiments, with reference to the drawing. In the drawing:

DESCRIPTION OF THE PREFERRED EMBODIMENT

Figure 1:
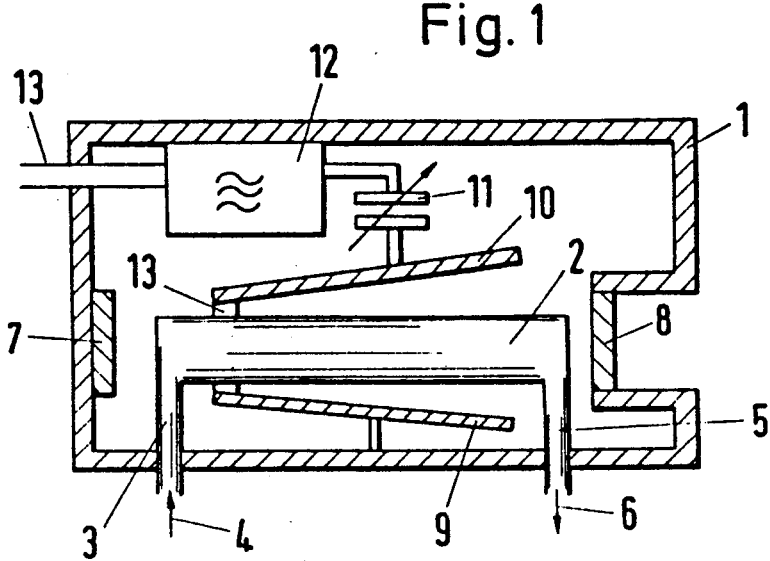
FIG. 1 shows, in cross-section, an embodiment of the gas laser according to the invention.

The gas laser of FIG. 1 exhibits a housing 1 of electrically conductive material, in which a discharge tube 2 is situated, through which gas to be excited is passed. For this purpose, the discharge tube 2 possesses a tubular connection 3, through which gas can be introduced in the direction of the arrow 4. Moreover, it possesses a tubular outlet 5, through which the gas can flow out again in the direction of the arrow 6. On the left there is disposed at the wall of the housing a non-transmitting mirror 7, and on the right a semi-transmitting mirror 8, which are aligned parallel to one another in such a manner that the laser action of the gas in the discharge tube 2 can take place between them; in this arrangement, the laser light then passes out through the semi-transmitting mirror 8 to the right.

The gas in the discharge tube 2 is excited by two mutually oppositely disposed electrodes 9 and 10, of which the electrode 10 is connected, via an impedance adaptation element 11, to the power output stage of a high-frequency generator 12. Further elements which are required for the impedance adaptation, e.g. an inductance, can be provided, for example, within the power output stage 12. The high-frequency power output stage is supplied, via conductors 13, with high frequency from a high-frequency oscillator and/or with electrical power.

The electrodes 9 and 10 exhibit a spacing from the discharge tube 2, which spacing increases in the direction of flow of the gas from left to right, as is diagrammatically represented in FIG. 1. Moreover, there is situated between the discharge tube 2 and the electrodes 9, 10 in the Figure on the left, i.e. on the inflow side of the gas, an annular element 13 of high dielectric constant, through which element the high-frequency field strength is further increased in this case.

The gas flowing in from the left is accordingly very greatly excited on the left in the region of the electrodes, while on the further flow path the coupling and thus the transmitting high-frequency power become smaller, so that instabilities due to excessively great heating of the gas or plasma cannot occur.

Figure 2:
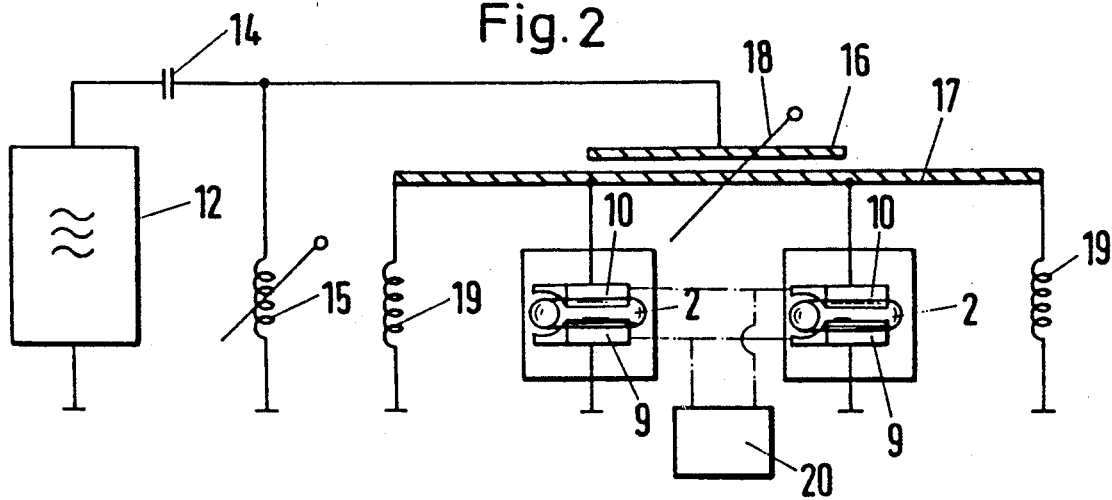
FIG. 2 shows, in diagrammatic representation, the arrangement of essential parts of the gas laser.
Figure 3:
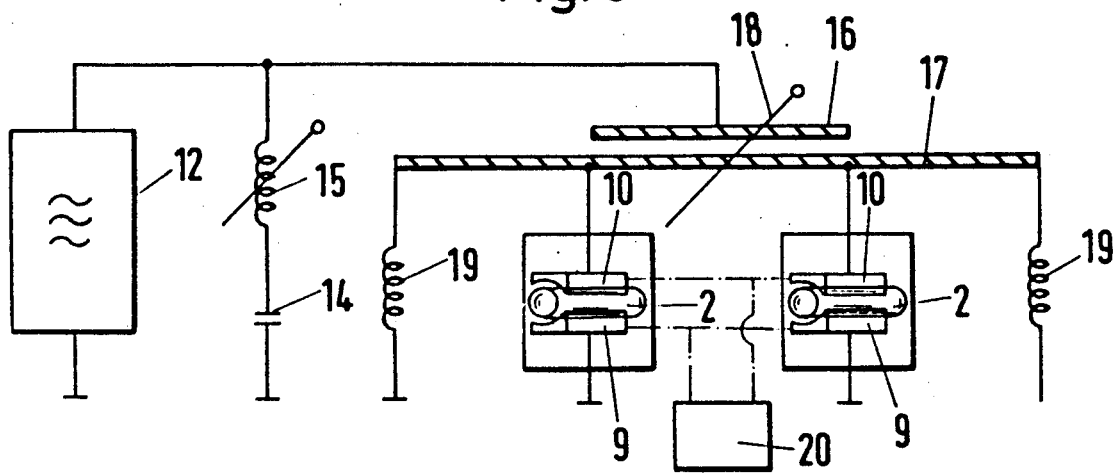
FIG. 3 shows an arrangement similar to that shown in FIG. 2.

FIGS. 2 and 3 show an arrangement in which a plurality of electrode pairs 9, 10 are provided in succession. In this arrangement, the discharge tube 2 is shown only in part, namely as two pieces which are disposed in succession but which are, in reality, of course connected to one another. In this arrangement, as can be seen from the Figures, the electrodes 9 and 10 are also not constructed as simple plates, as can be seen from FIG. 1, but surround the discharge tube 2 in part.

The supply of high-frequency energy likewise takes place by means of a high-frequency power output stage 12, to which an impedance adaptation circuit consisting of a capacitor 14 and a variable inductance 15, which are connected in series, is connected.

From there, the high-frequency power passes to a plate 16 of a plate capacitor, the other layer of which is formed by the further plate 17. In this arrangement, the plate 16 is movable for the purpose of varying the capacitance and thus for the purpose of varying the adaptation, which is indicated by the known circuit symbol, which is designated by 18.

The electrodes 10 are now connected to the plate 17. Since the plate 17 can have a length which becomes comparable with the wavelength of the high frequency, inductances 19 are additionally connected to the plate 17, so that an approximately equally good adaptation can be achieved for all electrodes.

In FIGS. 2 and 3, an adjusting device for the electrodes is shown at 20. The spacing of the electrodes 9, 10 from the discharge tube 2 can, for example, be set by this adjusting device 20. The angle between electrodes and discharge tube can also be set by the devices 20. Finally, the devices 20 can be disposed in such a manner that the electrodes can be rotated on the discharge tube. In this arrangement, the device 20 can be a simple manual adjustment facility, which is actuated by hand when the high frequency is de-energized. However, drives to be actuated from outside may also be provided, which can be actuated even when the high frequency is energized, in order in this manner to optimize the power while the laser is operating.

What is claimed is:

1. Gas laser having a discharge tube, through which the gas flows in an axial direction and to which highfrequency electrodes are fitted externally, and having a high-frequency generator, characterized in that the power output stage (12) of the high-frequency generator is disposed in the housing (1) of the laser resonator (2, 7, 8) and is directly connected to the electrodes (9, 10) via impedance adaptation elements (11, 14 to 18).

2. Gas laser according to claim 1, characterized in that it exhibits a plurality of electrodes (9, 10), which are disposed in succession in the longitudinal direction of the discharge tube (2) and which are connected to a common first plate (17), which extends longitudinally of the discharge tube (2) and which is constructed at one of the layers of an impedance adaptation element in the form of a plate capacitor (16, 17, 18).

3. Gas laser according to claim 2, characterized in that the electrodes (9, 10) are disposed in such a manner that their spacing from the discharge tube (2) varies in the longitudinal direction of the same.

4. Gas laser according to claim 3, characterized in that the spacing increases in the direction of flow of the gas.

5. Gas laser according to claim 4, characterized in that the spacing increases linearly.

6. Gas laser according to claim 1, characterized in that the space between the discharge tube (2) and the electrodes (9, 10) is filled, in the region of the front edges of the same as seen in the direction of flow of the gas, with a material (13) of high dielectric constant.

7. Gas laser according to claim 6, characterized in that the material (13) of high dielectric constant is of annular shape.

8. Gas laser according to claim 6, characterized in that the relative dielectric constant of the annular material (13) is greater than 2.

* * * * *